United States Patent
Lau et al.

(10) Patent No.: US 9,572,207 B2
(45) Date of Patent: Feb. 14, 2017

(54) DIMMING RANGE EXTENSION

(71) Applicant: Infineon Technologies Austria AG, Villach (AT)

(72) Inventors: Tiam Poh Lau, Singapore (SG); Zhongfang Wang, Singapore (SG)

(73) Assignee: Infineon Technologies Austria AG, Villach (AT)

(*) Notice: Subject to any disclaimer, the term of this patent is extended or adjusted under 35 U.S.C. 154(b) by 341 days.

(21) Appl. No.: 13/966,513

(22) Filed: Aug. 14, 2013

(65) Prior Publication Data

US 2015/0048761 A1 Feb. 19, 2015

(51) Int. Cl.
*H05B 33/08* (2006.01)
*H02M 3/155* (2006.01)
*H02M 3/335* (2006.01)
*H02M 1/00* (2006.01)
*H02M 5/293* (2006.01)

(52) U.S. Cl.
CPC ......... *H05B 33/0815* (2013.01); *H02M 3/155* (2013.01); *H05B 33/0845* (2013.01); *H02M 3/33507* (2013.01); *H02M 2001/0045* (2013.01); *H02M 2005/2932* (2013.01)

(58) Field of Classification Search
CPC . H05B 33/0815; H05B 33/0845; H02M 3/155
USPC ........................................ 315/307
See application file for complete search history.

(56) References Cited

U.S. PATENT DOCUMENTS

| | | | |
|---|---|---|---|
| 8,749,174 B2 * | 6/2014 | Angeles | H05B 33/083 315/219 |
| 8,816,598 B2 | 8/2014 | Dilger | |
| 8,829,819 B1 * | 9/2014 | Angeles | H05B 33/0815 315/219 |
| 2003/0057888 A1 | 3/2003 | Archenhold et al. | |
| 2010/0134038 A1 | 6/2010 | Shackle et al. | |
| 2011/0109230 A1 | 5/2011 | Simi | |
| 2011/0193488 A1 | 8/2011 | Kanamori et al. | |
| 2011/0234115 A1 | 9/2011 | Shimizu et al. | |
| 2011/0241557 A1 * | 10/2011 | Grotkowski | H05B 33/0824 315/246 |
| 2012/0274216 A1 * | 11/2012 | Datta | 315/127 |
| 2012/0319621 A1 * | 12/2012 | Sutardja et al. | 315/307 |
| 2013/0049622 A1 * | 2/2013 | Angeles | H05B 33/0848 315/224 |
| 2015/0103568 A1 * | 4/2015 | Del Carmen, Jr. | H02M 3/33507 363/21.16 |

FOREIGN PATENT DOCUMENTS

| | | |
|---|---|---|
| CN | 1843061 A | 10/2006 |
| CN | 102640570 A | 8/2012 |
| CN | 102752940 A | 10/2012 |
| CN | 103025337 A | 4/2013 |
| DE | 102010001919 A1 | 8/2011 |

* cited by examiner

*Primary Examiner* — Dylan White
(74) *Attorney, Agent, or Firm* — Murphy, Bilak & Homiller, PLLC

(57) ABSTRACT

Representative implementations of devices and techniques provide a dimming arrangement for a variable load, such as a lamp. The dimming arrangement is coupled to a drive circuit for the load and arranged to reduce a drive current associated with the drive circuit, based on a control voltage.

25 Claims, 5 Drawing Sheets

DIMMING RANGE EXTENSION

BACKGROUND

With the proliferation of light-emitting-diode (LED) lamps, as well as other types of lamps, there are many applications which include dimming the lamps. For example, it is often desirable for LED lamps in residential and commercial applications to be dimmable. In some cases, it may be desirable for LED lamps to have the capability to change intensity when used in instrumentation, user interface displays, and other information-related applications. Further, display screens for information or entertainment applications make use of LED lamps that dim and/or change colors.

Many dimmable LED lamp applications have a desired dimming range that includes less than 5% brightness. However, common LED drive circuits (such as switch-mode power supplies (SMPS), for example) may have a narrow output dimming range that stops at greater than 10% brightness, for example, when coupled to a dimmer with a narrow conduction angle. This means that dimming at the lowest (least bright) end of the dimming range may not be progressive, but may have abrupt steps in intensity, including turning off the LED at around 10% of the dimming range, for example. In many applications, this may be an undesirable dimming performance.

Generally, problems with dimming at the lower levels of the dimming range occur when the input current to an LED driver is reduced, causing unintended turn off of one or more driver components. For example, a reduced input current may result in an insufficient holding current to the one or more components, causing an early turn off of the components. This can result in a narrow dimming range, where the lower end of the dimming range is cut off at or above the 10% dimming level, and can also cause flickering issues with an LED lamp.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

When varying the intensity of a lamp, it is often desirable to do so in an aesthetically pleasing and progressive manner. In other words, it is desirable to continuously change the intensity of the lamp rather than make changes abruptly. This includes making intensity changes at the lower (less bright) end of a dimming range. However, it is common for an LED dimmer to have an early cut-off point at the lower end of the dimming range (about 10% to 20% of the range, for example).

Representative implementations of devices and techniques provide a dimming arrangement for a variable load, such as a lamp, which provides an extended dimming range. In various implementations, the dimming arrangement is progressive into the lower end of the dimming range, including through 5% or less brightness of the dimming range. In an implementation, the dimming arrangement is provided to reduce the drive current to the load, based on a control voltage.

In some implementations, a semiconductor device, such as a transistor, for example, is arranged to channel at least a portion of the drive current away from the load when activated by the control voltage. Additionally, the semiconductor device may be arranged to refrain from conducting current when no dimming is desired, or when no dimmer is used with the load. Accordingly, there may be little to no power loss from the dimming arrangement during high intensity operation of the load.

Various implementations and techniques for a dimming arrangement are discussed in this disclosure. Techniques and devices are discussed with reference to example light-emitting-diode (LED) lamps, devices, and systems. However, this is not intended to be limiting, and is for ease of discussion and illustrative convenience. The techniques and devices discussed may be applied to any of various lamp device designs, types, and the like (e.g., liquid-crystal-display (LCD), poly-vinyl-alcohol (PVA) display, piezoelectric material display, electron-stimulated lamps, incandescent lamps, electroluminescent (EL) lamps, etc.), as well as other continuously variable control systems (motor loads, etc.) that utilize one or more control signals, and remain within the scope of the disclosure.

Implementations are explained in more detail below using a plurality of examples. Although various implementations and examples are discussed here and below, further implementations and examples may be possible by combining the features and elements of individual implementations and examples.

Example Drive Arrangement

Figure 1:
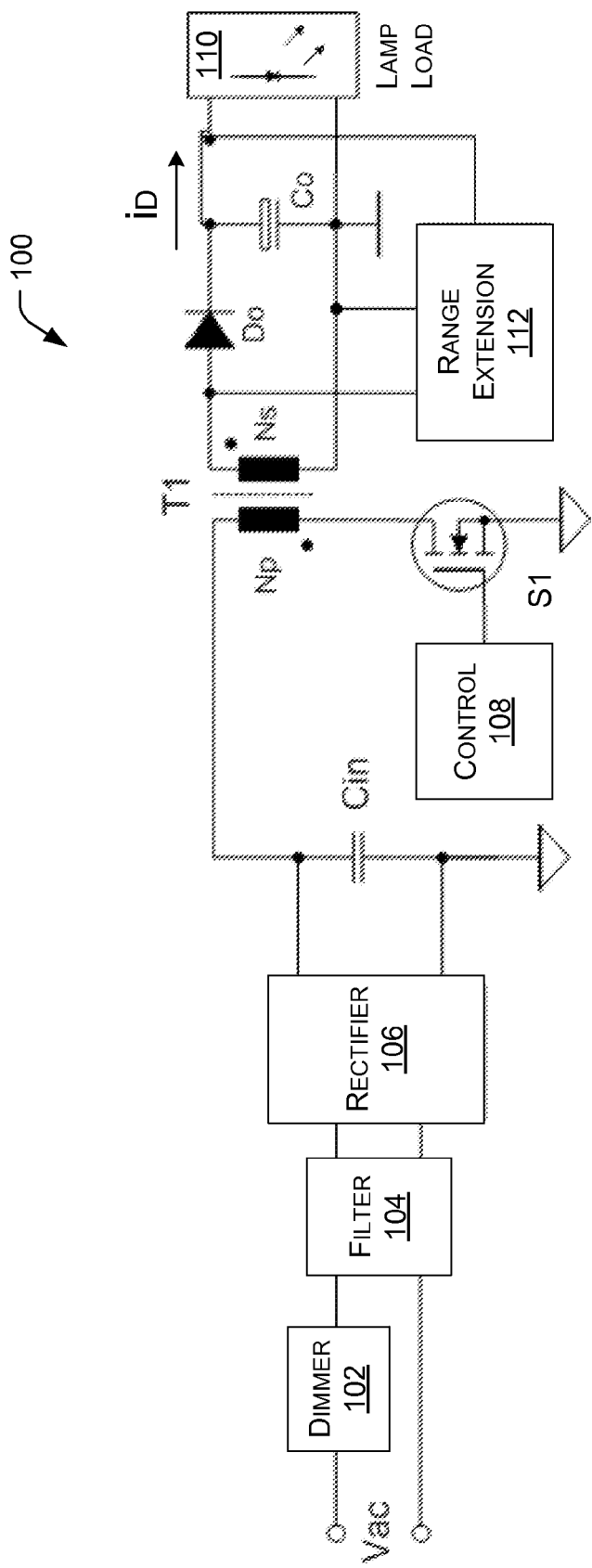
FIG. 1 is a block diagram of an example drive arrangement for a load such as a lamp, in which the techniques described herein may be employed, according to an implementation.

FIG. 1 is a block diagram of an example drive arrangement (i.e., drive circuit) 100 for a load 110 such as a lamp, in which the techniques described herein may be employed, according to an implementation. For example, the drive arrangement 100 may be arranged to vary the brightness of a lamp 110, change the color of the lamp 110, vary the intensity of a variable load 110, and the like. In an implementation, the drive arrangement is arranged to energize the lamp 110 via a drive current.

As illustrated in FIG. 1, an example drive arrangement 100 may include one or more dimming devices ("dimmers") 102, one or more filters 104, a rectifier 106, a transformer T1, a control unit 108, and a load ("lamp") 110, for example. In an implementation, the drive arrangement 100 also includes a range extension module ("bleeder circuit") 112. In alternate implementations, fewer, additional, or alternative components may be included.

In an implementation, the dimmer 102 determines the overall intensity (e.g., brightness) of the lamp 110. In an implementation, the dimmer 102 is arranged to receive and to modify the input signal Vac to represent a desired lamp 110 intensity. In the implementation, the drive arrangement 100 is arranged to output the drive current ("$i_D$") based on the modified input signal. For example, in an implementation, the dimmer 102 receives an alternating current input signal ("Vac") and reduces the energy in the input signal, based on the desired dimming level. In alternate implementations, the desired dimming level may be received from various sources, such as from a user, from an output of a process, or the like.

In some implementations, the dimmer 102 comprises a phase-cut dimming device, or similar device. A phase-cut dimmer 102 can be arranged to remove or cut selected portions of the input AC signal, thereby reducing the energy of the waveform. For example, the phase-cut dimmer 102 may remove a portion of each leading edge or each trailing edge of each half-cycle of the AC waveform. In alternate implementations, the dimmer 102 may remove other portions of the AC waveform, or may reduce the energy of the waveform using another technique.

If included, one or more filters 104 may filter the modified or dimmed waveform output from the dimmer 102. For example, one or more filter(s) 104 may comprise an electromagnetic interference (EMI) filter, or the like, arranged to filter stray impulses or other transients from the dimmed waveform. In alternate implementations, the filter(s) 104 may be arranged to shape the dimmed waveform, or the like.

In an implementation, the rectifier 106 may be arranged to convert the modified input waveform to a varying waveform having a single polarity. For example, the rectifier 106 may be arranged to convert the modified input waveform to a unidirectional rectified waveform with varying voltage values. In alternate implementations, the unidirectional rectified waveform may have varying voltage values with either a positive polarity for all of the values or a negative polarity for all of the values.

Figure 2:
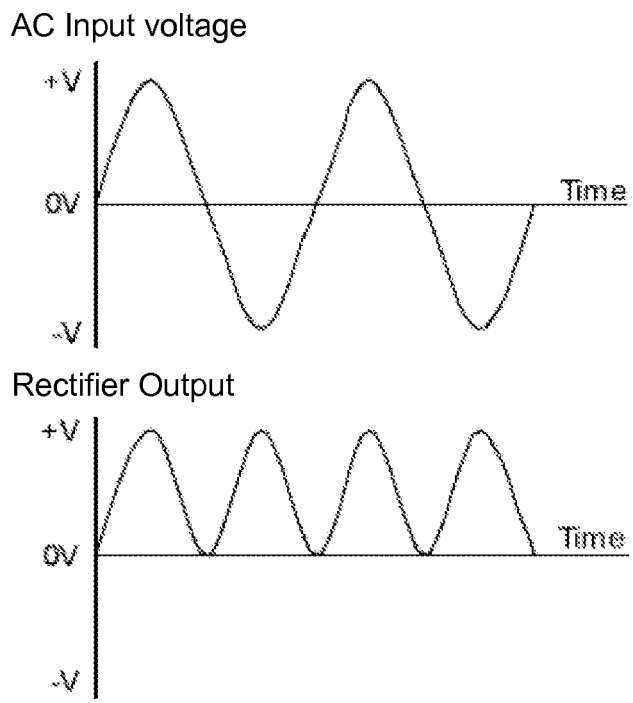
FIG. 2 is a diagram showing example waveforms of the example drive arrangement of FIG. 1, for example, according to an implementation.

FIG. 2 is a diagram showing example waveforms of the example drive arrangement 100 of FIG. 1, for example, according to an implementation. As shown in FIG. 2, the AC input voltage Vac may be a cyclic waveform having a peak-to-peak magnitude of "2V" with alternating polarities. The bi-directional nature of the input waveform is shown in FIG. 2. As shown, the waveform alternates between positive and negative values, alternately peaking at +V and −V. Once the dimmer 102 has modified the input waveform, the modified input voltage may have a lesser peak-to-peak magnitude, such as "V," or the like.

Also shown in FIG. 2, is an example output waveform of the rectifier 106. In an implementation, as shown in FIG. 2, the rectifier is a full-wave rectifier, converting the entire modified (e.g., dimmed) input waveform to a unidirectional waveform having a single constant polarity (shown in FIG. 2 as a positive waveform, for example), while still varying in a cyclical manner. As shown in FIG. 2, the rectified voltage waveform carries information of the modified (e.g., dimmed) input voltage waveform. For example, the rectified voltage waveform includes phase conduction angle and amplitude information.

In the example illustrated in FIG. 2, the rectified voltage waveform alternately peaks at about 0V and at +V. In other implementations, the output waveform of the rectifier 106 may have a negative polarity, or may have other forms and/or shapes.

In an implementation, the transformer T1 is arranged to receive the modified (e.g., rectified) input signal voltage and to output a secondary voltage proportional to the modified input signal. For example, the rectified input voltage is received at the primary winding of the transformer T1 when the switch S1 closes. In the implementation, the transformer T1 inductively applies a voltage proportional to the rectified input voltage to the secondary winding of the transformer T1 (when S1 closes), to produce the secondary voltage waveform. In an implementation, the average value of this secondary voltage is used as the control signal for the bleeder circuit 112.

In an implementation, as illustrated in FIG. 1, the drive arrangement 100 comprises a flyback-type switch-mode power supply (SMPS) or converter. For example, in an on-state, the input voltage Vac energizes the primary winding of the transformer T1, while the output capacitor Co supplies energy to the load 110. In a second state, the secondary winding of the transformer T1 energizes the load 110, via a drive current $i_D$ through an output diode Do, and also charges the output capacitor Co with the drive voltage.

In an implementation, a triode device S1 is arranged as a switch to cycle the drive arrangement 100 between the first state and the second state. For example, in an implementation, when the triode device S1 becomes a closed switch (e.g., through biasing of the gate or base, etc.), this switches the drive arrangement 100 to the first state. When the triode device S1 becomes an open switch, this switches the drive arrangement 100 to the second state.

In an example implementation, as shown in FIG. 1, the triode device S1 is switched via a control module 108. For example, in an implementation, the control module 108 may output a switching signal, such as a pulse-width modulated (PWM) signal, for example, to control the switching of the triode device S1. In such an example, the switching signal determines the open-switch and closed-switch events of the triode device S1. In alternate implementations, the drive arrangement 100 may use other control techniques to control the switching of the triode device S1.

As discussed above, the lamp 110 may be a variable intensity LED lamp, another type of variable lamp, or another controlled system that uses variable control signals. In an implementation, the lamp 110 comprises a quantity of LEDs, or the like.

The lamp 110 is energized via the drive current $i_D$ based on the drive voltage across output capacitor Co. In one implementation, changes to the dimmer 102 and/or the input voltage Vac can adjust the intensity (e.g., brightness) and/or color of the lamp 110.

In alternate implementations, a drive arrangement 100 may include fewer, additional, or alternate components.

Example Range Extension Module

Figure 3:
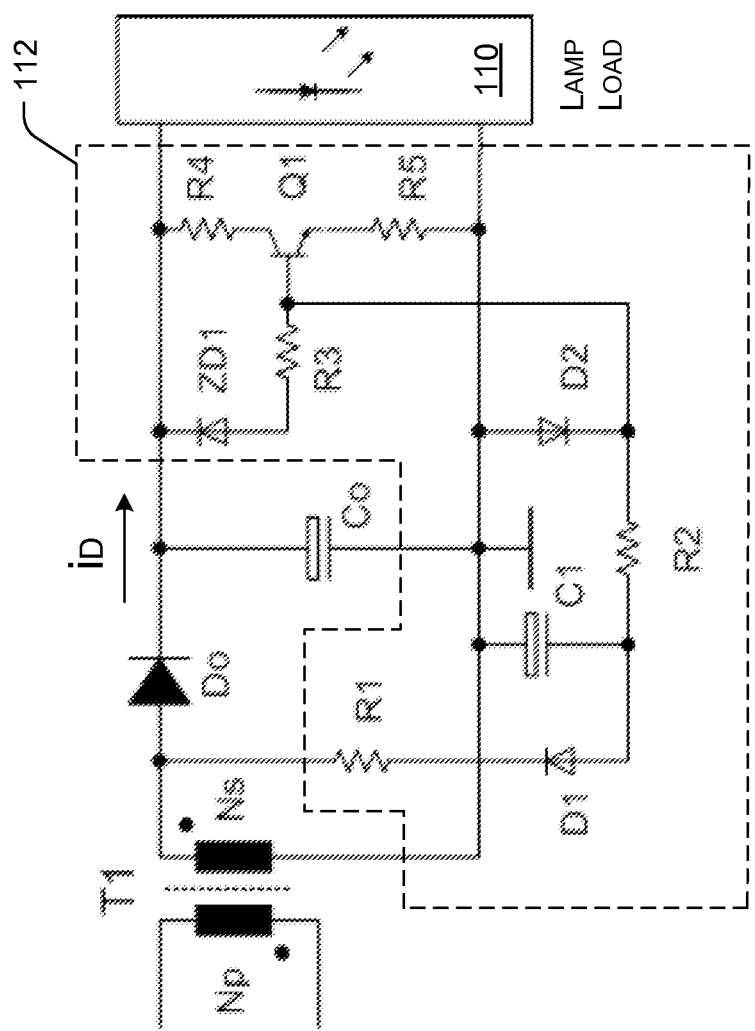
FIG. 3 is a schematic diagram of a bleeder circuit, which may be employed with the example drive arrangement of FIG. 1, for example, according to an implementation.

According to various implementations, when included, the bleeder circuit 112 is arranged to adjust an intensity of the lamp (or other variable load) 110 by adjusting the drive current $i_D$, according to a control signal (i.e., a control voltage). The bleeder circuit 112 illustrated in FIG. 3 is shown in an example implementation with a single channel. In various implementations, multiple bleeder circuits 112 may be used with multiple drive arrangements 100 to provide intensity adjustments for multiple channels of a multi-channel brightness/color control arrangement, for example.

In an implementation, the bleeder circuit 112 is a hardware device (e.g., an electronic circuit, etc.) coupled to the drive arrangement 100, and arranged to adjust an intensity of the lamp 110 by adjusting the drive current $i_D$ that energizes the lamp 110. For example, the bleeder circuit 112 may dynamically adjust the intensity of the lamp 110, as desired intensities change, by diverting a portion of the drive current $i_D$ away from the lamp 110. Thus, in an implementation, the bleeder circuit 112 provides an extended range of intensity values during dimming transitions, including at the lower (e.g., less bright) end of the dimming range. For example, in one implementation, the bleeder circuit 112 provides progressive dimming for dimming values less than 20% or less than 10% intensity (e.g., brightness).

FIG. 3 is a schematic diagram of a range extension module (e.g., bleeder circuit) 112, which may be employed with the example drive arrangement (i.e., drive circuit) 100 of FIG. 1, for example, according to an implementation. In one implementation, the bleeder circuit 112 includes a detection portion (comprising R1, D1, and C1) and a current sink portion (comprising Q1, ZD1, D2, R2, R3, R4, and R5). In an implementation, as shown in FIG. 3, the bleeder circuit 112 is arranged to adjust intensity (e.g., brightness) of the lamp 110.

In one implementation, the detection portion is arranged to detect the control voltage from the secondary voltage of transformer T1 output from the drive components (e.g., T1, R1, C1, and D1) of the drive circuit 100. In one implementation, the detection portion detects a direct-current (DC) voltage signal based on the secondary voltage, which is based on the rectified input voltage. For example, in the implementation, the control voltage is a DC voltage signal proportional to the average value of the rectified input voltage. In an implementation, the control signal (i.e., the control voltage) comprises the voltage across the capacitor C1.

In an implementation, since the rectified input voltage is representative of a desired intensity value of the lamp 110, the control voltage is also representative of a desired intensity value of the lamp 110.

In an implementation, the current sink portion (comprising Q1, ZD1, D2, R2, R3, R4, and R5) is arranged to be coupled to the output of the drive components (e.g., T1, Do, and Co). In the implementation, the current sink portion is arranged to reduce the drive current $i_D$ that is output from the drive components, based on the control voltage detected by the detection portion.

For example, in an implementation, the current sink portion is arranged to channel at least a portion of the drive current $i_D$ away from the lamp 110, based on the control voltage. In the implementation, at least a portion of the drive current $i_D$ is diverted away from the lamp 110, causing the lamp 110 to receive a lesser portion of the drive current $i_D$ during dimming, thereby decreasing the brightness of the lamp during dimming.

In an implementation, the operation of the current sink portion is based on an absolute value of the DC control voltage. For example, in one implementation, the voltage controlled current sink portion is arranged to reduce (e.g., conduct, channel, etc.) the drive current $i_D$ less as an absolute value of the control voltage increases and is arranged to reduce the drive current $i_D$ more as the absolute value of the control voltage decreases.

In an implementation, as shown in FIG. 3, the current sink portion includes a (e.g., low voltage) semiconductor device (a transistor device, for example) Q1 arranged to channel at least a portion of the drive current $i_D$ away from the lamp 110 when activated during dimming. In the implementation, a gate of the semiconductor device Q1 is arranged to activate the semiconductor device Q1 in response to the control voltage.

In an implementation, at maximum brightness level or when the dimmer 102 is not activated, the control voltage has a high absolute value. This is because the absolute value of the control voltage increases and decreases as the amplitude of the modified input voltage, and therefore the secondary voltage, increases and decreases respectively. With a high control voltage amplitude, and based on selected values for R2, R3, and ZD1, the voltage at the base (or gate) of semiconductor device Q1 will be below Q1's turn on threshold. As a result, no current flows through semiconductor device Q1. Therefore, the drive current $i_D$ to the lamp 110, and the efficiency (e.g., power dissipation) of the drive arrangement 100, at a maximum brightness level is not impacted by the bleeder circuit 112.

When the brightness level is desired to be less, the modified input voltage, the secondary voltage amplitude, and the absolute value of the control voltage at C1 will be lower. As a result, the voltage at the base of semiconductor device Q1 will rise, and when above a threshold, current (e.g., bleeding current) will flow through semiconductor device Q1. The bleeding current through semiconductor device Q1 will rise with lower brightness levels, and will reach a maximum value when the brightness level is at a minimum.

Accordingly, in an implementation, the semiconductor device Q1 is arranged to conduct less current when an absolute value of the control voltage magnitude increases and is arranged to conduct more current when the absolute value of the control voltage magnitude decreases. In one example, the semiconductor device Q1 is arranged to conduct current when an absolute value of the control voltage is at a minimum value and is arranged to refrain from conducting current when the absolute value of the control voltage is at a maximum value.

In an implementation, as shown in FIG. 3, the drive arrangement 100 includes a diode (ZD1) in series with the gate of the semiconductor device Q1 that is arranged to prevent the semiconductor device Q1 from conducting current during start-up of the system. In the implementation, this helps to reduce start-up time of the drive arrangement 100.

Additionally, the drive arrangement 100 may include the diode D2 to prevent damage to semiconductor device Q1 due to negative voltage appearing at its base (or gate). Also, the resistor R4 may be included to share power dissipation with the semiconductor device Q1. In alternate implementations, the resistor R4 may not be needed if semiconductor device Q1 has the capability to dissipate sufficient heat on its own.

Figure 4:
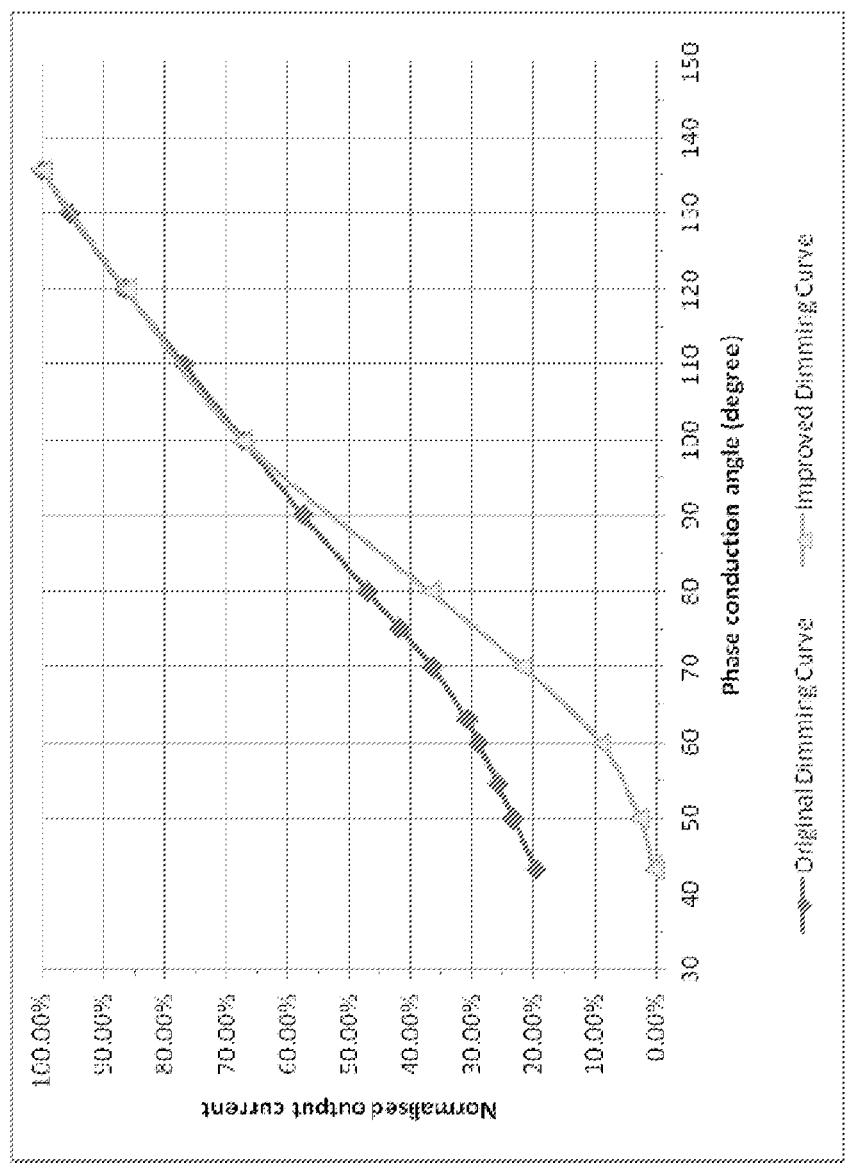
FIG. 4 is a diagram showing a comparison of dimming responses for the example drive arrangement of FIG. 1, for example, with and without the bleeder circuit of FIG. 3, according to an implementation.

FIG. 4 is a diagram showing a comparison of dimming responses for an example drive circuit 100, for example, with and without the bleeder circuit 112, according to various implementations. As shown in FIG. 4, the "original dimming curve" of an example drive circuit 100 without a bleeder circuit 112, as discussed herein, may have a narrowed dimming range. For example, the dimming range may span from 100% brightness down to around 20% brightness. As shown in FIG. 4, the dimming curve may have an abrupt end at around 20%, or thereabout, if, for instance, the drive circuit 100 is shut off early, due to insufficient input current to dimmer 102, for example.

In contrast, as shown in FIG. 4, the "improved dimming curve" represents the dimming range of an example drive circuit 100 with a bleeder circuit 112 employed with the drive circuit 100, as discussed herein. The drive circuit 100 may have an extended dimming range, spanning from 100% brightness to about 0% brightness, for example, as shown in FIG. 4. As seen in the illustrated graph of FIG. 4, the extended dimming range may be continuous and progressive over the entire dimming range. In alternate implementations, the extended dimming range may vary by up to 5%, for example.

While the illustrated curves in the graph of FIG. 4 are shown with respect to a "phase conduction angle" of a phase-cut dimmer, the graph, as well as the techniques and devices described herein are applicable to various other types, designs, and constructions of dimming devices and arrangements. In alternate implementations, other dimming curves may be representative of the techniques and/or devices described herein.

In various implementations, several advantages may be realized by using the bleeder circuit 112 with a drive arrangement 100, or the like. For example, the bleeder circuit 112 operates to provide an extended dimming range for the drive arrangement 100 based on the output current $i_D$ of the drive arrangement 100. As such, the magnitude of the input current is maintained, rather than pulled down during dimming operations. Accordingly, potential erratic behavior of the drive arrangement 100 with respect to the lamp 110 can be minimized or avoided (e.g., flicker, early or unintended turn-off, etc.).

Further, in various implementations, startup time may not be negatively impacted, due to the operation of the bleeder circuit 112 on the drive current $i_D$, particularly when used with a diode ZD1, as shown in FIG. 3.

The dimming operations of the bleeder circuit 112 are controlled based on the input voltage, while not impacting the input voltage or input current. In various implementations, this makes the bleeder circuit 112 compatible with a variety of drive circuits or arrangements 100. Additionally, the bleeder circuit 112 is an analog solution, adding to the compatibility of the circuit 112.

As discussed above, the techniques, components, and devices described herein with respect to the bleeder circuit 112 are not limited to the illustrations in FIGS. 1-4, and may be applied to other devices and designs without departing from the scope of the disclosure. In some cases, additional or alternative components may be used to implement the techniques described herein. Further, the components may be arranged and/or combined in various combinations, while resulting in dimming range extension. It is to be understood that a bleeder circuit 112 and/or a drive arrangement 100 may be implemented as a stand-alone device or as part of another system (e.g., integrated with other components, systems, etc.).

Representative Process

Figure 5:
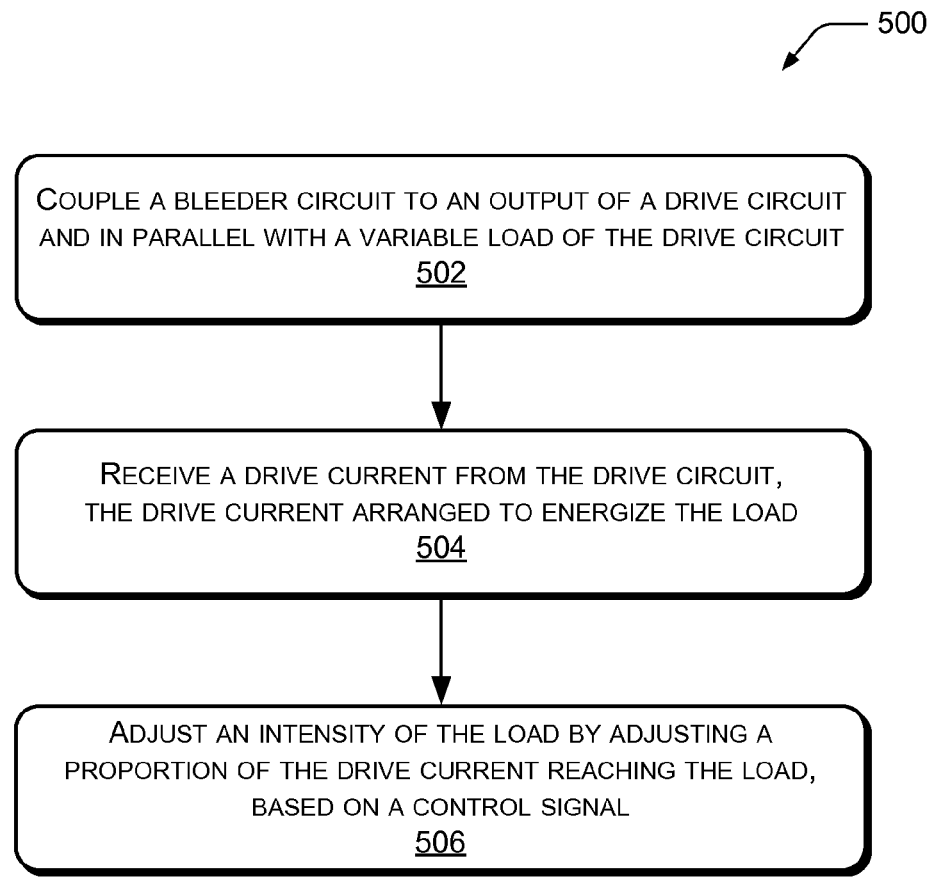
FIG. 5 is a flow diagram illustrating an example process for adjusting an intensity of a load, according to an implementation.

FIG. 5 is a flow diagram illustrating an example process 500 for adjusting an intensity of a load, such as the brightness of a lamp (e.g., lamp 110) for example, according to an implementation. The process 500 describes using a voltage controlled bleeder circuit (such as bleeder circuit 112, for example) with the drive circuit of the load. The process 500 is described with reference to FIGS. 1-4.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 502, the process includes coupling a bleeder circuit (such as bleeder circuit 112, for example) to a drive circuit (such as drive circuit 100, for example) and in parallel with a variable load (such as lamp 110, for example) of the drive circuit. In various implementations, the load includes a LED-based lamp, another type of lamp, a variable load (such as a motor load, etc.), or the like.

In an implementation, the process includes receiving an input voltage and modifying the input voltage to produce a modified input voltage representing a desired dimming level. For example, a dimmer (such as dimmer 102, for example) may be used to modify the input voltage to represent a desired dimming level. In an implementation, the dimmer is a phase-cut dimmer, or the like.

In an implementation, the process includes rectifying the modified input voltage to produce a rectified input voltage having a single polarity. For example, in various implementations, a rectifier (such as rectifier 104, for example) may be used to produce the rectified input voltage. In an implementation, the rectifier comprises a bridge rectifier, such as a bridge diode or bridge circuit, for example. In another implementation, the rectifier comprises a full-wave rectifier, arranged to produce a unidirectional rectified voltage that includes both halves of a periodic waveform cycle.

In an implementation, the process includes transforming the rectified input voltage to produce a secondary voltage on the secondary winding of a transformer (such as transformer T1, for example).

At block 504, the process includes receiving a drive current (such as drive current $i_D$, for example) from the drive circuit, where the drive current is arranged to energize the load.

At block 506, the process includes adjusting an intensity of the load by adjusting a proportion of the drive current reaching the load, based on a control signal (i.e., control voltage). For example, in an implementation, the process includes adjusting a brightness of a lamp based on the control signal.

In an implementation, the process includes dimming the load (e.g., lamp) by channeling (i.e., conducting) at least a portion of the drive current away from the load when an absolute value of the control signal is less than a threshold value.

In an implementation, the process includes sinking (i.e., conducting) at least a portion of the drive current using a transistor device (such as semiconductor device Q1, for example) arranged to conduct at least a portion of the drive current when the absolute value of the control signal is less than the threshold value. For example, in one implementation, the process includes conducting a greater portion of the drive current away from the load when the absolute value of the control signal decreases and conducting a lesser portion of the drive current away from the load when the absolute value of the control signal increases.

In an implementation, the process includes determining the control signal from the secondary voltage. For example, in one implementation, the process includes detecting the control signal from the secondary voltage using a detector circuit or detector components, as described above. In an implementation, the control signal comprises a direct-current (dc) voltage proportional to a root-mean-square (RMS) value or an average of the input voltage.

In alternate implementations, other techniques may be included in the process 500 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An electronic circuit, comprising:
a transformer of a drive circuit;
a detection portion of a bleeder circuit, the detection portion connected to a secondary winding of the transformer and configured to detect an average voltage of the secondary winding; and
a current sink portion of the bleeder circuit, the current sink portion connected to the detection portion and configured to reduce a drive current associated with the drive circuit, based on the average voltage of the secondary winding detected by the detection portion, the drive current arranged to energize a load.

2. The electronic circuit of claim 1, wherein the electronic circuit is arranged to be coupled in parallel to the load and to adjust an intensity of the load.

3. The electronic circuit of claim 1, wherein the load comprises a lamp and the electronic circuit is arranged to adjust a brightness of the lamp.

4. The electronic circuit of claim 1, wherein the average voltage of the secondary winding is proportional to an average value of a modified input voltage of the drive circuit, the modified input voltage representative of a desired intensity value of the load.

5. The electronic circuit of claim 1, wherein the current sink portion is configured to reduce the drive current less as an absolute value of the average voltage of the secondary winding increases and to reduce the drive current more as the absolute value of the average voltage of the secondary winding decreases.

6. The electronic circuit of claim 1, wherein the current sink portion includes a semiconductor device configured to channel at least a portion of the drive current away from the load when an absolute value of the average voltage of the secondary winding is at a minimum value and to refrain from conducting current when the absolute value of the average voltage of the secondary winding is at a maximum value.

7. A system, comprising:
a variable load; and
a drive circuit arranged to energize the load via a drive current, the drive circuit including a transformer and a bleeder circuit,
wherein the bleeder circuit comprises:
a detection portion connected to a secondary winding of the transformer and configured to detect an average voltage of the secondary winding; and
a current sink portion connected between an output capacitor of the drive circuit and the variable load, the current sink portion configured to reduce a drive current associated with the drive circuit, based on the average voltage of the secondary winding detected by the detection portion, the drive current arranged to energize the variable load.

8. The system of claim 7, wherein a dimmer of the drive circuit is configured to receive and to modify an input signal to represent a desired load intensity, and wherein the drive circuit is configured to output the drive current based on the modified input signal.

9. The system of claim 8, wherein the average voltage of the secondary winding is proportional to an average value of a modified input voltage of the drive circuit, the modified input voltage representative of a desired intensity value of the load.

10. The system of claim 7, wherein the load comprises a lamp and the bleeder circuit is arranged to adjust a brightness of the lamp based on the average voltage of the secondary winding.

11. The system of claim 10, wherein the lamp comprises one or more light-emitting-diodes.

12. The system of claim 7, wherein the drive circuit comprises a flyback-type switch-mode power supply (SMPS) including a pulse-width modulation controlled triode device.

13. The system of claim 7, wherein the current sink portion of the bleeder circuit includes a transistor device arranged to channel at least a portion of the drive current away from the load when activated, wherein a gate of the transistor device is configured to activate the transistor device in response to the average voltage of the secondary transformer winding.

14. The system of claim 13, wherein the transistor device is configured to conduct less current when an absolute value of the average voltage of the secondary winding increases and conduct more current when the absolute value of the average voltage of the secondary winding decreases.

15. The system of claim 13, wherein the current sink portion of the bleeder circuit further includes a diode in series with the gate of the transistor device and configured to prevent the transistor device from conducting current during start-up of the system.

16. A method, comprising:
coupling a bleeder circuit to a drive circuit and a variable load of the drive circuit, the drive circuit comprising a transformer, the bleeder circuit comprising a detection portion connected to a secondary winding of the transformer and a current sink portion connected between an output capacitor of the drive circuit and the variable load;
receiving a drive current from the drive circuit, the drive current arranged to energize the load;
detecting, by the detection portion of the bleeder circuit, an average voltage of secondary winding of the drive circuit; and
adjusting, by the current sink portion of the bleeder circuit, an intensity of the load by adjusting a proportion of the drive current reaching the load, based on the average voltage of the secondary winding.

17. The method of claim 16, further comprising conducting at least a portion of the drive current away from the load when an absolute value of the average voltage of the secondary winding is less than a threshold value.

18. The method of claim 17, further comprising sinking at least the portion of the drive current using a transistor device of the current sink portion of the bleeder circuit, transistor device configured to conduct at least the portion of the drive current when the absolute value of the average voltage of the secondary winding is less than the threshold value.

19. The method of claim 17, further comprising conducting a greater portion of the drive current away from the load when the absolute value of the average voltage of the secondary winding decreases and conducting a lesser portion of the drive current away from the load when the absolute value of the average voltage of the transformer winding increases.

20. The method of claim 16, further comprising:
receiving an input voltage;
modifying the input voltage to produce a modified input voltage representing a desired dimming level;
rectifying the modified input voltage to produce a rectified input voltage having a single polarity;
transforming the rectified input voltage to produce a secondary voltage at the secondary winding; and
detecting, by the detection portion of the bleeder circuit, the secondary voltage to detect the average voltage of the secondary winding.

21. The method of claim 20, wherein the average voltage of the secondary winding is proportional to an average value of the input voltage.

22. The method of claim 16, further comprising adjusting a brightness of a lamp based on the average voltage of the secondary winding.

23. The method of claim 22, further comprising dimming the lamp by channeling at least a portion of the drive current away from the lamp when an absolute value of the average voltage of the secondary winding is less than a threshold value.

24. A dimmable lamp system, comprising:
a variable intensity light-emitting-diode (LED) lamp; and
a drive circuit arranged to energize the lamp via a drive current, the drive circuit including a transformer and a bleeder circuit,
wherein the bleeder circuit comprises:
a detection portion connected to a secondary winding of the transformer and configured to detect an average voltage of the secondary winding; and
a current sink portion connected between an output capacitor of the drive circuit and the lamp, the current sink portion configured to reduce a drive current associated with the drive circuit, based on the average voltage of the secondary winding detected by the detection portion the drive current arranged to energize the lamp.

25. The dimmable lamp system of claim 24, wherein the bleeder circuit is arranged to conduct more current as an absolute value of the average voltage of the secondary winding decreases and to conduct less current as the absolute value of the average voltage of the secondary winding increases.

* * * * *